United States Patent [19]

Ben-Natan et al.

[11] Patent Number: 5,790,779
[45] Date of Patent: Aug. 4, 1998

[54] METHOD AND SYSTEM FOR CONSOLIDATING RELATED ERROR REPORTS IN A COMPUTER SYSTEM

[75] Inventors: Or Ben-Natan; Michael L. Davis, both of Bellevue; Bruce W. Copeland, Redmond; Jonathan Ilan Shuval, Bellevue, all of Wash.

[73] Assignee: Microsoft Corporation, Redmond, Wash.

[21] Appl. No.: 845,889

[22] Filed: Apr. 28, 1997

Related U.S. Application Data

[63] Continuation of Ser. No. 403,243, Mar. 10, 1995, abandoned.
[51] Int. Cl.[6] ........................................... G06F 13/00
[52] U.S. Cl. ............................. 395/183.15; 395/183.22
[58] Field of Search ...................... 395/183.13, 183.15, 395/183.21, 183.22, 183.19, 183.01; 371/48

[56] References Cited

U.S. PATENT DOCUMENTS

| | | |
|---|---|---|
| 4,633,467 | 12/1986 | Abel et al. .......................... 371/16 |
| 4,943,919 | 7/1990 | Aslin et al. ..................... 364/424.03 |
| 5,036,514 | 7/1991 | Downes et al. ....................... 371/16 |
| 5,159,685 | 10/1992 | Kung .................................. 395/575 |
| 5,388,189 | 2/1995 | Kung ................................... 395/50 |
| 5,438,675 | 8/1995 | Fujioka .......................... 395/182.07 |

Primary Examiner—Robert W. Beausoliel, Jr.
Assistant Examiner—Norman M. Wright
Attorney, Agent, or Firm—Seed and Berry LLP

[57] ABSTRACT

A method and system for consolidating related error reports is provided. In a preferred embodiment, an facility preferably implemented in software ("the facility") receives error reports and success reports generated by programs. When the facility receives a novel error report specifying an error source for which no error state is set, it sets an error state corresponding to the error report. The facility also preferably generates a consolidated error report at this point, which is delivered to a error state reporting subsystem. The error state reporting subsystem may add the consolidated error report to an error log and/or display it to a user. When the facility receives a redundant error report specifying an error source for which an error state is already set, the facility preferably does not set a new error state, nor does it generate a consolidated error report. When the facility receives a success report specifying an error source, it clears any error states that are set for the specified error source, and preferably generates a consolidated success report. The performance of the facility is preferably optimized by processing success reports asynchronously.

18 Claims, 12 Drawing Sheets

| field | contents |
|---|---|
| | error report ~400 |
| object type of error source | file server ~401 |
| object identifier of error source | \\server1 ~402 |
| operation of error source | read file ~403 |
| type of error | server not connected ~404 |

*FIG. 4* success report ~900

| field | contents |
|---|---|
| object type of error source | file server |
| object identifier of error source | \\server1 |
| operation of error source | read file |

|  field | contents |
| --- | --- |
| | consolidated success report ~1100 |
| object type of error source | file server |
| object identifier of error source | \\server1 |
| operation of error source | read file |
| total number of occurrences | 4 |

*FIG. 11*

:::page
5,790,779

METHOD AND SYSTEM FOR CONSOLIDATING RELATED ERROR REPORTS IN A COMPUTER SYSTEM

CROSS-REFERENCE TO RELATED APPLICATION

This application is a continuation of U.S. patent application No. 08/403,243, filed Mar. 10, 1995, now abandoned.

TECHNICAL FIELD

The invention relates generally to a method and system for computer error handling, and, more specifically, to a method and system for consolidating related error reports.

BACKGROUND OF THE INVENTION

It is common for computer systems to be connected in computer networks ("networks"). In a typical network, computer systems designated for use by users ("desktops") are connected to each other and to "servers"—computer systems that provide resources such as storage or output devices for use by other computer systems. When a program executing on a computer system in the network, such as an application program, fails to successfully complete a requested operation, that program typically generates and submits an error report, containing information about the failure, such as the time at which it occurred, the identity of the computer system on which it occurred, and nature of the error. Such error reports are usually stored in an error log that is central to the entire network. Such a network error log is typically reviewed by a network administrator in order to attempt to identify and resolve, or "troubleshoot," problems with computer systems within the network. Error reports generated by a desktop may also be stored in a local log on the desktop, and/or displayed to the user of the desktop. Error reports stored in a log or displayed to a user are said to be presented to a user.

It is common for programs to generate and submit a new error report every time a failure occurs, including instances in which the failure is identical to an earlier failure to complete the same operation. This can lead to "error flooding"—the delivery of many redundant error reports to a recipient, either the user of the desktop or a system administrator. Error flooding interferes with the recipient's ability to interpret and resolve problems, because it greatly increases the number of error reports that the recipient must review without providing a corresponding increase in the amount of useful information conveyed. Error flooding can be exacerbated by a general tendency of programs to repeat operations that they fail to complete successfully.

SUMMARY OF THE INVENTION

It is an object of the invention to provide a method and system in a computer system for consolidating related error reports in order to present error information to users.

It is another object of the invention to provide a method and system in a computer system for forwarding only novel error reports to an error presentation subsystem, thereby avoiding forwarding redundant error reports that increase error report volume without correspondingly increasing the volume of useful information conveyed.

It is a further object of the invention to provide a method and system in a computer system for processing success reports asynchronously.

It is yet another object of the invention to provide a method and system in the computer system for reporting the success of a previously failed operation defined by a computer program, thereby conveying an indication that the failure susceptible operation completed successfully.

It is a still further object of the invention to maintain an error state data object indicating the error states of one or more error sources.

These objects, as well as other objects which will become apparent as the invention is more fully described below, are provided by a method and system for consolidating related error reports. In a preferred embodiment, an error consolidation facility preferably implemented in software ("the facility") receives error reports and success reports generated by programs, such as application programs. For an error susceptible operation performed within a program, the program generates an error report if the operation fails and a success report if the operation succeeds. When the facility receives a novel error report specifying a new error, it sets an error state corresponding to the error report. The facility also preferably generates a consolidated error report at this point, which is delivered to an error presentation subsystem. The error presentation subsystem may add the consolidated error report to an error log and/or display it to a user. When the facility receives a redundant error report specifying an error for which an error state is already set, the facility preferably does not set a new error state, nor does it generate a consolidated error report. When the facility receives a success report specifying an error that has been overcome, it clears any error states that are set for the overcome error.

BRIEF DESCRIPTION OF THE DRAWINGS

FIG. 4 is a data structure diagram showing the contents of a typical error report generated for processing by the facility.

FIG. 9 is a data structure diagram showing the contents of a typical success report generated for processing by the facility.

FIG. 11 is a data structure diagram showing the contents of a typical consolidated success report generated by the facility.

DETAILED DESCRIPTION OF THE INVENTION

Figure 1A:
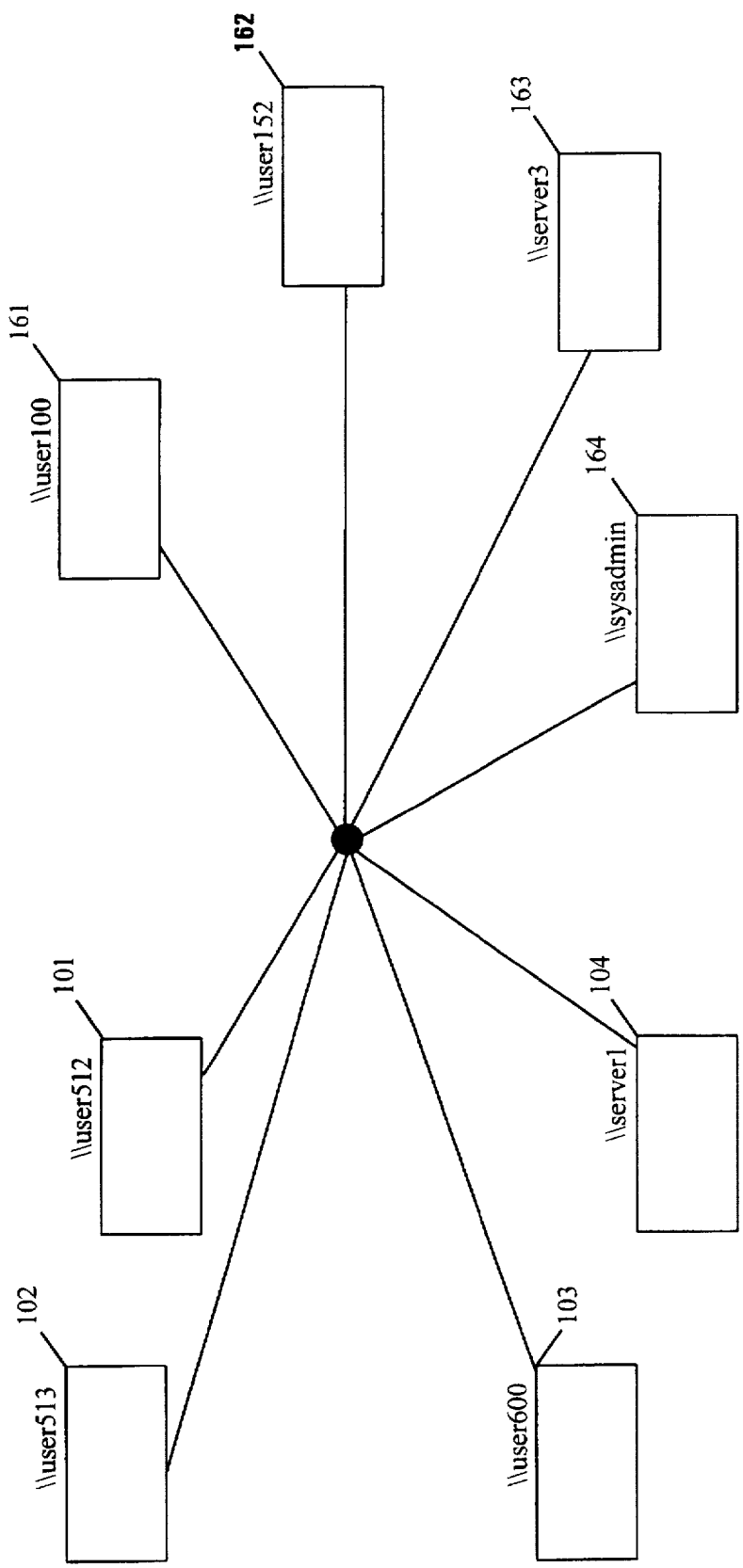
FIG. 1A is a high-level block diagram of a typical computer network in which the facility preferably operates.

The invention provides a method and system for consolidating reports of errors originating at the same source into an error state in order to provide more useful error information. In a preferred embodiment, an error consolidation facility preferably implemented in software ("the facility") receives error reports and success reports generated by error reporting programs, such as application programs. An error reporting program generates an error report when it is unable to successfully complete an operation. The error report specifies the source to which it attributes the error ("error source"), as well as the type of the error ("error type"). An error source specified by an error report preferably includes the system object, such as the physical device for another program, that failed to respond to the error report generating program as expected ("error object"). An error object is preferably comprised of an object type and an object identifier that uniquely identifies a particular object within the object type. An error source also preferably includes an identification of the operation that the error report generating program was unable to successfully complete "(operation"). Because many programs repeat, or "retry," operations that they are unable to successfully complete, it is typical for an error reporting program to generate several error reports specifying the same error source and operation. Any time the error reporting program successfully completes an operation for which the program would generate an error report if the program failed to successfully complete it, the error reporting program generates a success report specifying the error source to which a failure to successfully complete the operation would be attributed.

The facility represents error reports that it has received without subsequently receiving corresponding success reports as set error states. When the facility receives a novel error report specifying an error source and error type for which no error state is set, it sets an error state corresponding to the error report. The facility also preferably generates a consolidated error report at this point, which is delivered to a error state reporting subsystem. The error state reporting subsystem may add the consolidated error report to an error log and/or display it to a user. When the facility receives a redundant error report specifying an error source and error type for which an error state is already set, the facility preferably does not set a new error state, nor does it generate a consolidated error report. When the facility receives a success report specifying an error source, it clears any error states that are set for the specified error source.

The facility preferably represents an error state as an entry in an error state table, and thus creates a new entry in the error state table when a novel report is received. Each entry preferably contains a counter of the number of error reports received specifying its error source, which is initialized when a novel error report is received, and incremented when a redundant error report is received. The facility deletes an entry from the table when it receives a success report specifying the entry's error source.

FIG. 1A is a high-level block diagram of a typical computer network in which the facility preferably operates. The names of the computer systems connected by the network begin with the string "\" to denote their identity as separate nodes in a hierarchical name space. The computer systems connected by the network include user systems used primarily by individual users (e.g., \user 512 computer system 101, \user 513 computer system 102, \user600 computer system 103, \user100 computer system 161, and \user152 computer system 162), server computer systems used primarily to make available to user systems centralized resources such as storage devices and printers (e.g., \server1 computer system 104 and \server3 computer system 163), and an administrator computer system, \sysadmin computer system 164. The administrator computer system is preferably used by a system administrator to oversee the operation and error state of the entire network.

Figure 1B:
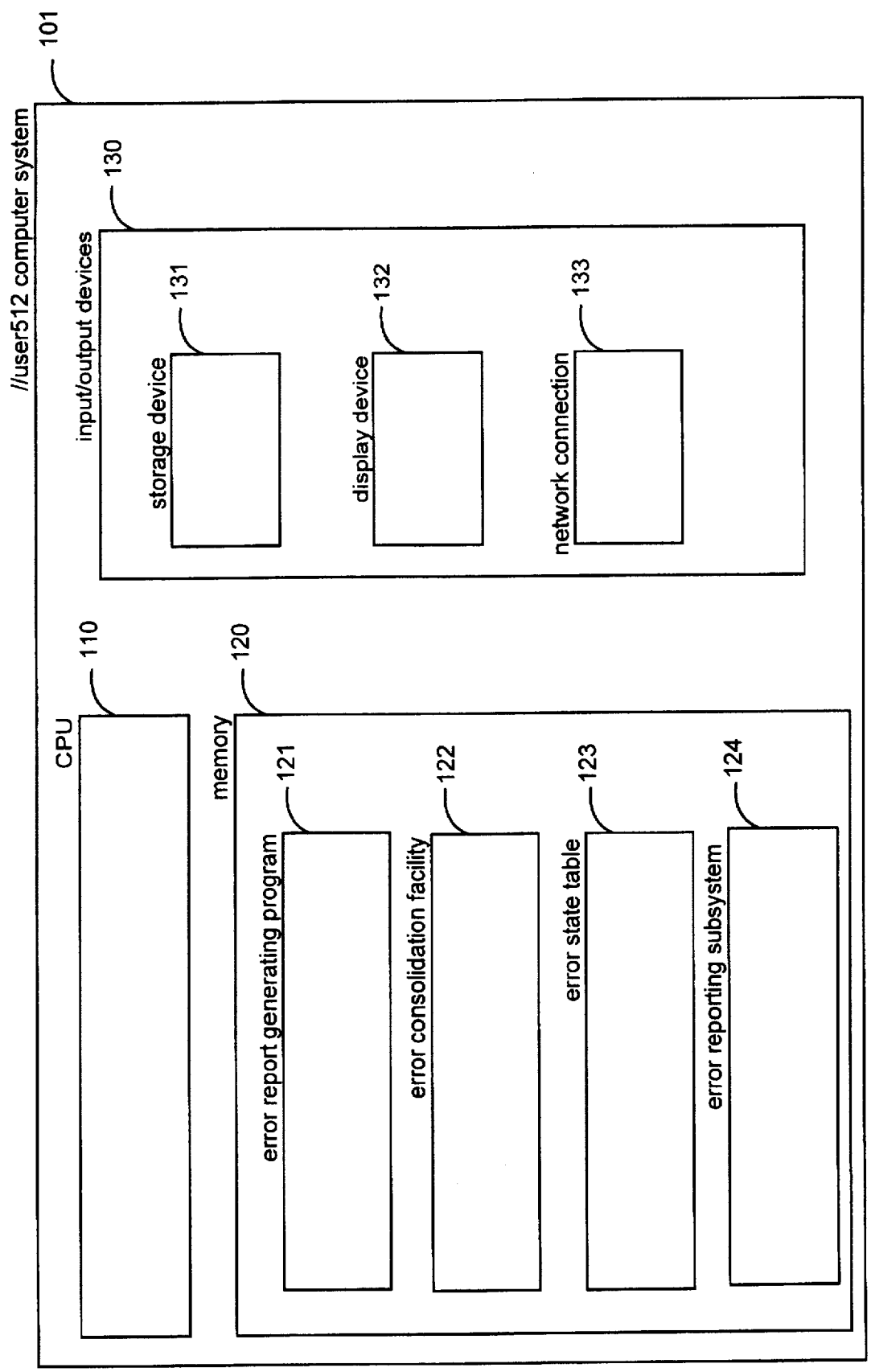
FIG. 1B is a high-level block diagram of a user 512 computer system, which is exemplary of the general-purpose computer systems upon which the facility preferably operates.

FIG. 1B is a high-level block diagram of the \user512 computer system, which is exemplary of the general-purpose computer systems upon which the facility preferably operates. The computer system 101 contains a central processing unit (CPU) 110, a computer memory (memory) 120, and input/output devices 130. Stored in the memory 120 are the facility 122, one or more error report generating programs 121 that generate error reports and success reports for processing by the facility 122, an error state table 123 for representing error states on behalf of the facility 122, and an error presentation subsystem 124 that preferably receives consolidated error reports from the facility 122 for presentation to a user. Among the input/output devices 130 are a storage device 131, such as a hard disk drive; a display device 132, such as a video monitor; and a network connection 133 for connecting the computer system to other computer systems via a network. While the facility is preferably implemented on a network and computer system configured as described above, one skilled in the art will recognize that it may also be implemented on networks and computer systems having different configurations.

Figure 2:
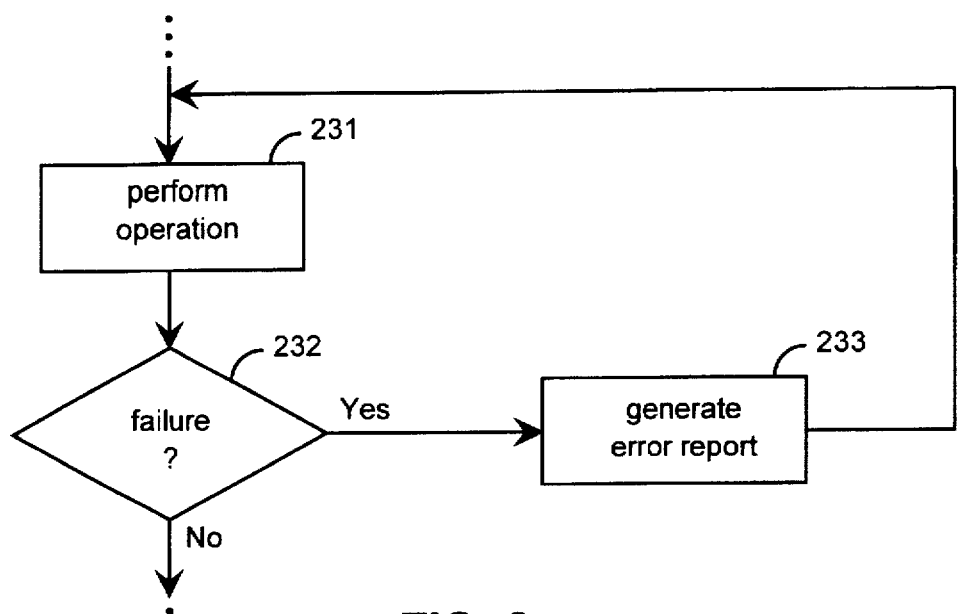
FIG. 2 is a flow diagram of the typical steps executed to perform conventional error-handling in an error report generating program.

FIG. 2 is a flow diagram of the typical steps executed to perform conventional error-handling in an error report generating program, such as an application program. The shown error-handling steps are typically preceded and/or succeeded by other substantive steps performed by the error report generating program. In step 231, the program performs an error-susceptible operation, such as reading a file stored on a storage device connected to a remote server. In step 232, if the operation performed in step 231 fails, then the program continues at step 233, else the program continues to execute the remainder of its steps. In step 233, the program generates an error report describing the error, and loops back to retry the operation in step 231. One skilled in the art will recognize that some error report generating programs would not retry the failed operation, and instead would execute the steps following the error handling steps after executing step 233.

Figure 3:
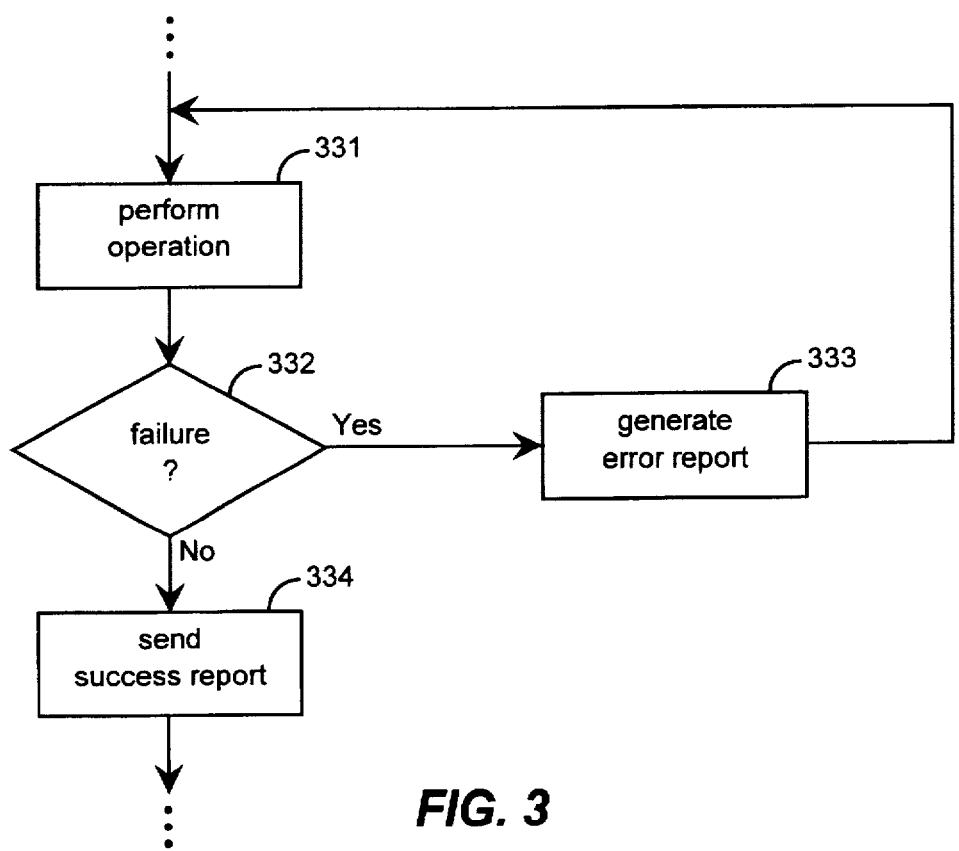
FIG. 3 is a flow diagram of the steps preferably performed by an error report generating program adapted to operate with the facility.

FIG. 3 is a flow diagram of the error handling steps preferably performed by an error report generating program, such as an application program, adapted to operate with the facility. The shown error-handling steps are typically preceded and/or succeeded by other substantive steps performed by the error report generating program. In step 331, the program performs a failure-susceptible substantive operation, such as reading a file from a server. Reading a file from a server is a failure-susceptible operation because it depends on many external conditions, such as that the file has not been deleted, moved, or renamed; that the server on which the file resides is reachable via the network; or that the user has read access rights for the file. The failure of any of these external conditions will cause the failure of the read operation. In step 332, if the operation performed in step 331 fails, then the program continues at step 333, else the program continues at step 334. In step 333, the program generates an error report as described in detail below. After step 333, the program loops back to retry the operation in step 331. One skilled in the art will recognize that error report generating programs that do not retry the failed operation, and instead execute the steps following the error handling steps after executing step 333, could also generate error reports for processing by the facility. In step 334, the program sends a success report indicating that the program successfully completed the operation of step 331. The success report is described in detail below. After step 334, the program executes the remainder of its steps.

FIG. 4 is a data structure diagram showing the contents of a typical error report generated for processing by the facility. A typical error report 400 describes a "server not connected" error encountered when trying to read a file from file server "\server1". Error report 400 contains four fields. While the contents of these fields are shown in FIG. 4 as text strings for clarity, they are preferably encoded in order to reduce the size of error reports. Fields 401–403 contain the components of the error source to which the error report generating program attributes the error. Object type field 401 contains an indication of the type of object to which the program generating the error report attributes the reported error. Such types can include servers, storage devices, display devices, and other programs. In this case, the contents of object type field 401 indicate that the error source is of type "file server". The object identifier field 402 contains an indication of the specific identity of the object to which the reporting program attributes the reported error. In this case, object identifier of error source field 402 contains the identifier "\server1". Operation field 403 contains an indication of the kind of operation that the reporting program was not able to successfully complete. In this case, operation field 403 contains an indication of a "read file" operation. Error type field 404 contains an indication of the type of error that is being reported. In this case, error type field 404 contains the error type "server not connected". After the error report has been generated by the generating program in step 333, it is submitted to the facility. As will be appreciated by one skilled in the art, the submission of an error report may take one of many forms, including an inter-process message, an interrupt, a function call, or a method invocation.

Figure 5:
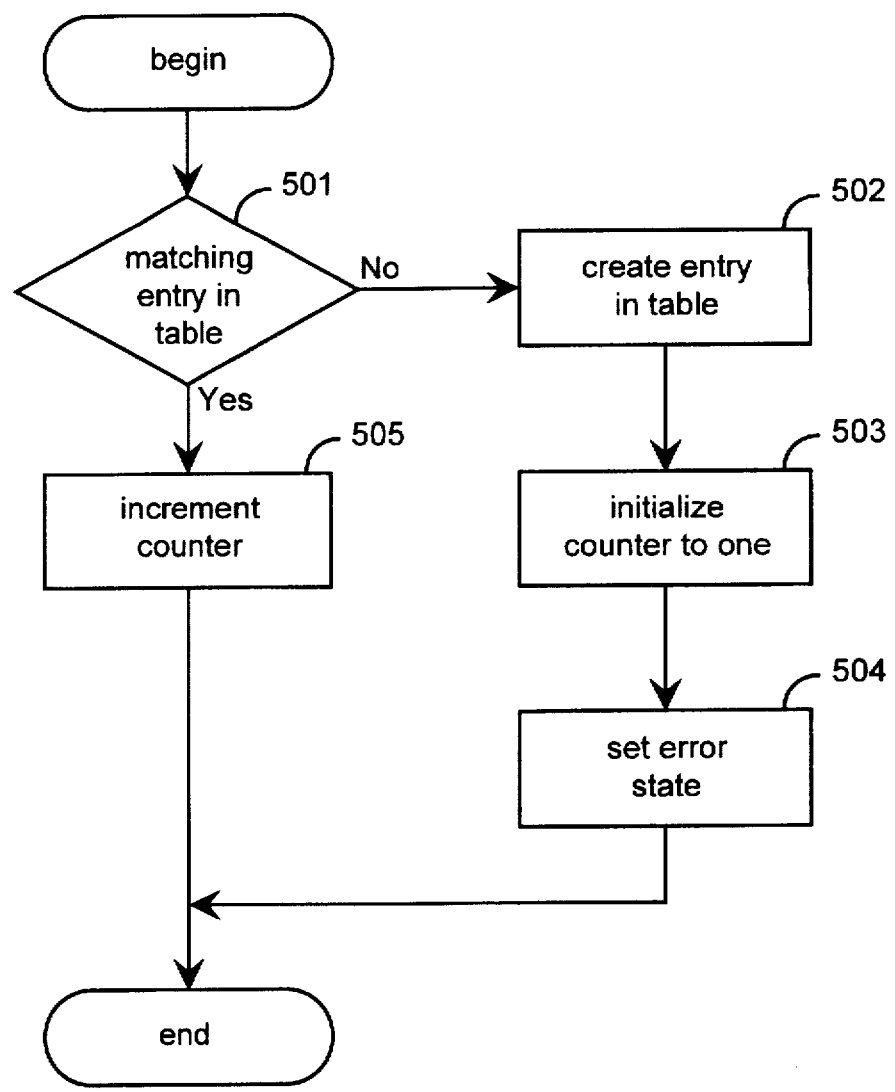
FIG. 5 is a flow diagram of the steps preferably performed by the facility in response to receiving an error report.

FIG. 5 is a flow diagram of the steps preferably performed by the facility in response to receiving an error report. As noted above, the facility utilizes an error state table to determine whether other instances of a particular error report have been received since the last success report has been received. In step 501, if the error state table contains an entry whose object type, object identifier, operation, and error type fields match those of the received error report, then the error report is a redundant error report the facility continues at step 505 to process it, else the error report is a novel error report and the facility continues at step 502 to process it. Step 501 is preferably performed by applying an efficient search algorithm to the error state table, such as the binary search algorithm. One skilled in the art will recognize that other efficient search algorithms could easily and beneficially be substituted therefor.

Figure 6:
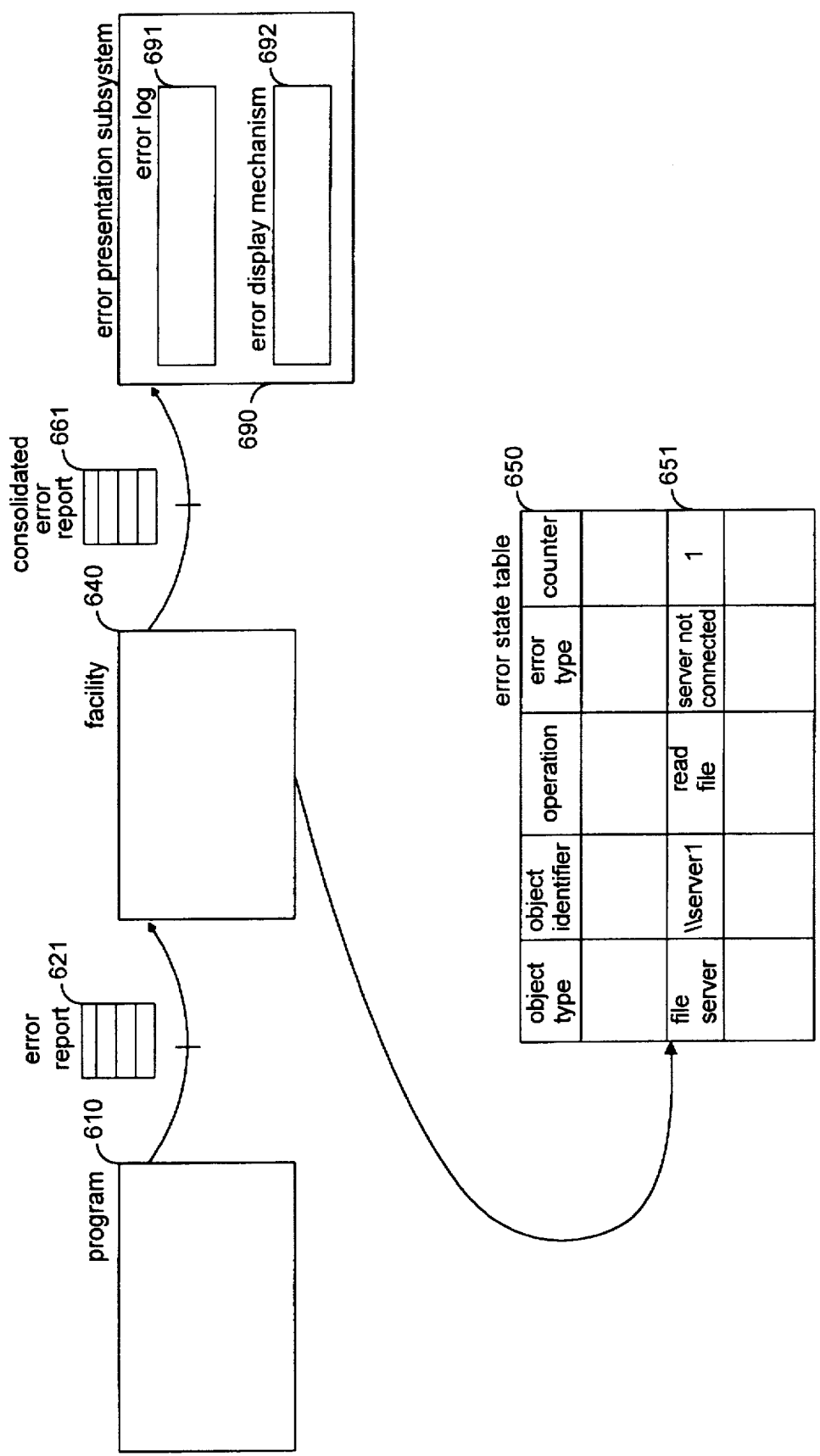
FIG. 6 is a diagram illustrating the processing of a novel error report by the facility.

FIG. 6 is a diagram illustrating the processing of a novel error report by the facility performed in steps 502–504. The diagram shows an error report generating program 610 generating an error report 621 for submission to the facility. In this example, the error report has the contents of the sample error report 400 shown in FIG. 4. In step 502, the facility creates an entry in the error state table containing the object type, object identifier, error type, and operation fields of the received error report 621. The created entry is shown as entry 651 in error state table 650. Error state table 650 has, for each entry, the same fields as an error report—object type, object identifier, operation, and error type. Each entry further contains a counter field indicating the number of error reports having the same field contents received since the last success report having the same field contents was received. New entry 651 therefore contains the contents of fields 401 through 404 in FIG. 4. The new entry 651 is preferably inserted in the error state table at a point that keeps the error state table sorted in an order that facilitates the sorting algorithm applied in step 501. For example, if the binary search algorithm is applied in step 501, new entry 651 is preferably inserted in the error state table at a point that keeps the error state table sorted first on object type, then on object identifier, then on error type. In step 503, the facility initializes the counter field of an entry created in step 502 (new entry 651) to one, indicating that one instance of the received error report has been received. In step 504, the facility generates a consolidated error report representing the set error state. The facility preferably sends the generated consolidated error report 661 to an error presentation subsystem 669 for presentation to a user, which is discussed in greater detail below. After step 504, the steps shown in FIG. 5 conclude.

The error presentation subsystem 690 contains an error log 691, in which the error presentation facility preferably records the consolidated error report. The error log may contain only consolidated error reports for programs executing on a single computer system, or alternatively may contain consolidated error reports from programs executing on a group of computer systems, such as those computer systems connected by the network. The error log may be stored on the computer system upon which the facility is executing or upon another computer system connected by the network, such as \sysadmin computer system 164 (FIG. 1). The error presentation subsystem also preferably contains an error display mechanism 692, which displays a textual or graphical error message or emits one or more sounds conveying the contents of the consolidated error report to a person—either the user of the error report generating program, or an administrator of the network.

Figure 7:
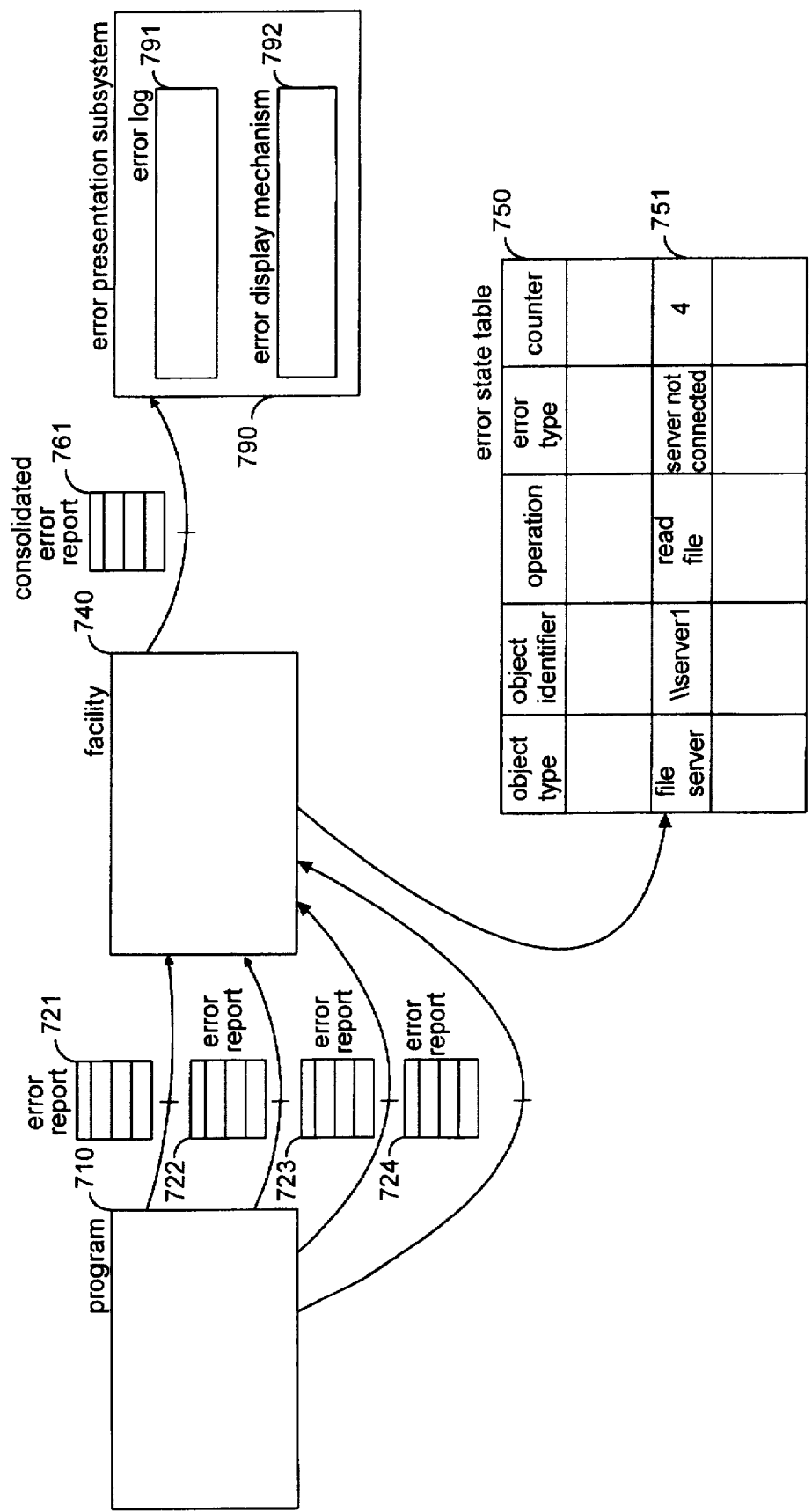
FIG. 7 is a diagram illustrating the processing of additional redundant error reports by the facility.

In step 505, the facility increments the counter field of the matching error state table entry. After step 505, the steps shown in FIG. 5 conclude. FIG. 7 is a diagram illustrating the processing of additional redundant error reports by the facility in step 505. After generating error report 721, containing the field contents shown in FIG. 4, the error report generating program 710 generates three further error reports, 722, 723, and 724, each also specifying the same field contents. The facility 740 receives each of them, incrementing the counter in entry 701 of the error state table, but not sending any additional consolidated error reports to the error presentation subsystem.

Figure 8:
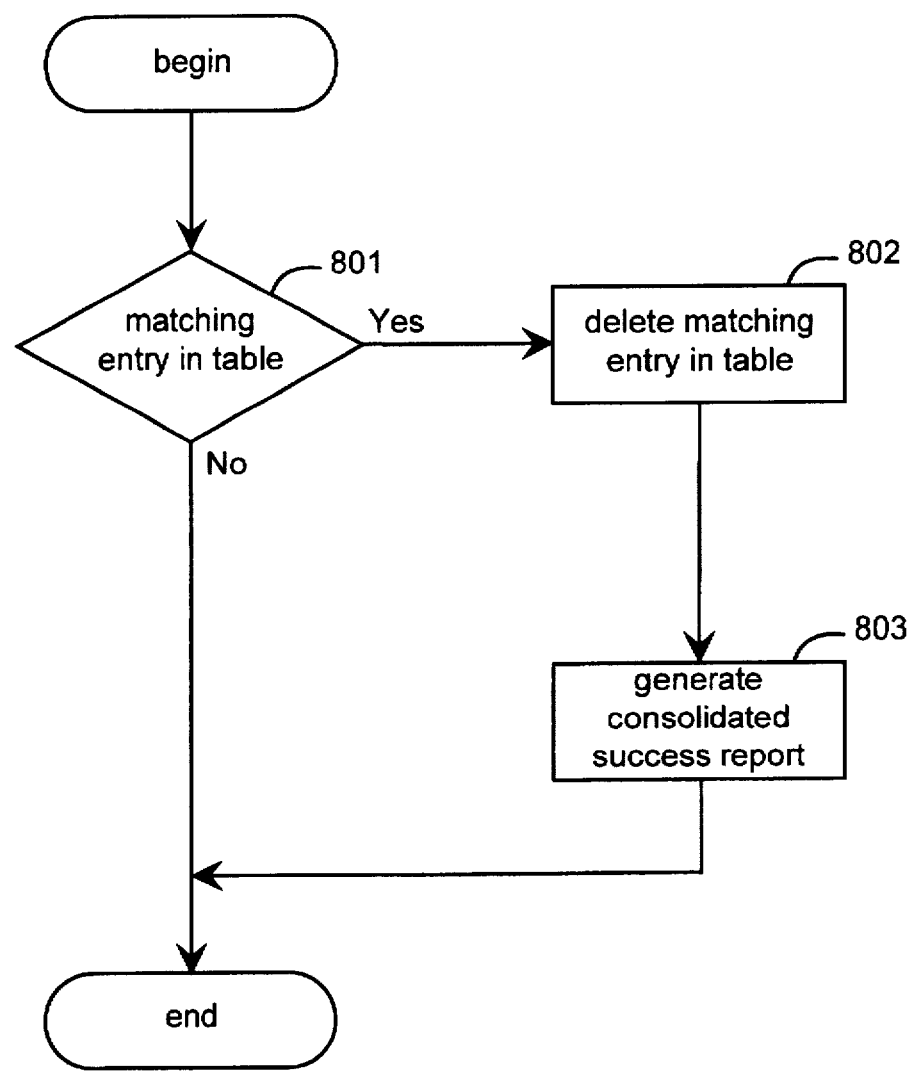
FIG. 8 is a flow diagram of the steps preferably performed by the facility when it receives a success report from an error report generating program.

FIG. 8 is a flow diagram of the steps preferably performed by the facility when it receives a success report from an error report generating program. FIG. 9 is a data structure diagram showing the contents of a typical success report generated for processing by the facility. The success report 900 contains the components of the error source to which an error would have been attributed if the succeeded operation had failed: and object type field 901, and object identifier field 902, and an operation 903. In the example, these fields contain the values "file server", "\server1", and "read file", respectively. These contents indicate that the error report generating program that generated the success report was successfully able to read a file from file server \server1.

Figure 10:
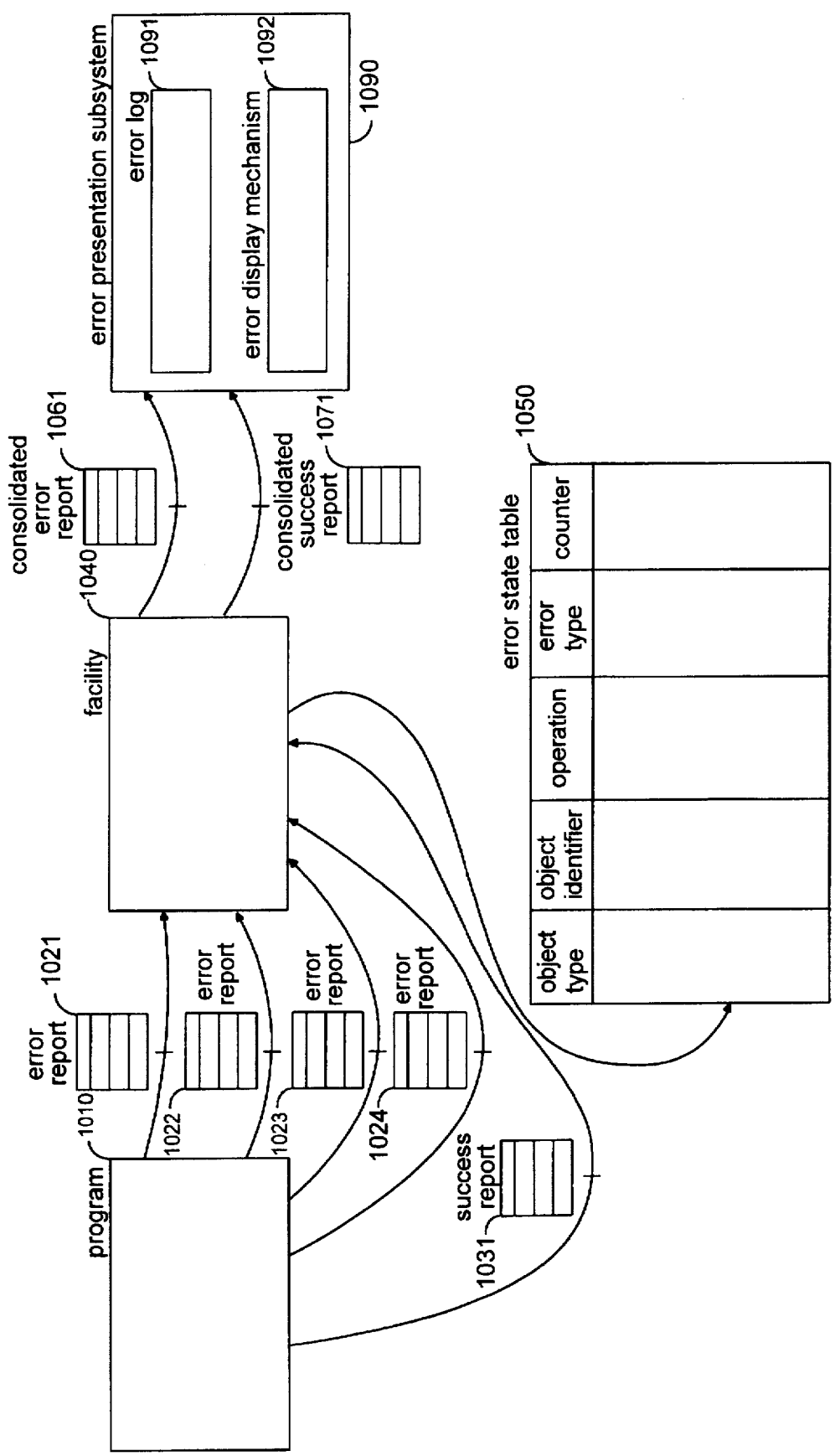
FIG. 10 is a diagram illustrating the processing of a success report by the facility.

FIG. 10 is a diagram illustrating the processing of a success report by the facility in steps 801-803. The diagram shows error report generating program 1010 generating a success report 1031 which is delivered to the facility 1040. In step 801, if the error state table contains any entries whose error source fields (object type, object identifier, and operation) match the error source fields in the received success report, then the facility continues in step 802, else these steps conclude. In step 802, the facility deletes the matching entries from the error state table. That is, the facility 1040 deletes the entry for the error stored in the error state table (entry 751 shown in FIG. 7). After step 802, the facility continues at step 803. In step 803, the facility generates a consolidated success report representing the clearing of any error states having the same object type, object identifier, and operation fields as the received success report to the error presentation subsystem. The facility preferably transmits a consolidated success report 1071 to the error presentation subsystem 1090. The error presentation subsystem preferably displays a message to a user indicating that the error has been resolved, and/or removes any error log entries corresponding to the field contents of the object type, object identifier, and operation fields of the consolidated success report. Instead of deleting these entries from the error log, the error presentation subsystem may instead mark these entries as resolved but retain them for future reference. After step 803, these steps conclude.

FIG. 11 is a data structure diagram showing the contents of a typical consolidated success report. Typical consolidated success report 1100 contains the object type, object identifier, and operation fields of the success report. In this case, these contain "file server", "\server1", and "read file", respectively. The consolidated success report 1 100 also contains a number of occurrences field 11 05 which contains an indication of the number of error reports received specifying these field values, i.e., the number of times the error source was found in error.

In a preferred embodiment, error report generating programs submit error reports and success reports to the facility by calling a routine exposed by the facility and passing the routine parameters containing the fields of the error report or success report. As a result, when an error report generating program submits an error report or a success report, the error report generating program is suspended until the facility completes its processing of the error report (FIG. 5) or the success report (FIG. 8), which may require a substantial amount of processing time. This suspension yields acceptable overall performance for error reports, since error reports are generated relatively infrequently—only when a failure-susceptible operation fails. However, the suspension yields unacceptable overall performance for success reports, because success reports are generated relatively frequently—each time a failure susceptible operation succeeds. In a performance-optimizing preferred embodiment, therefore, the facility processes success reports asynchronously using a separate thread, so that, when an error report generating program generates a success report, the error report generating program can resume execution before the facility completes its processing of the success report.

Figure 12:
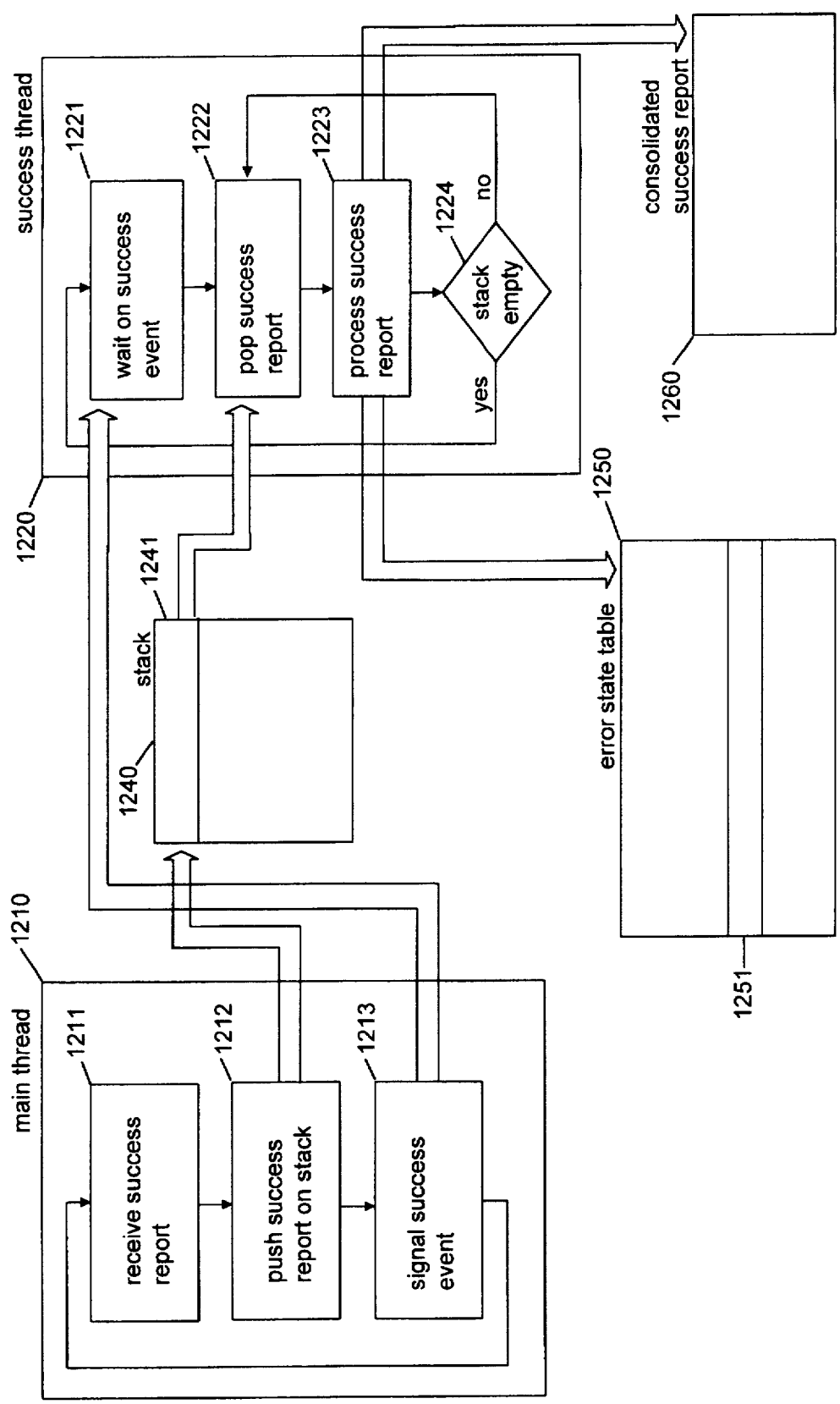
FIG. 12 is a figure illustrating the asynchronous processing of a success report by the facility.

FIG. 12 is a figure illustrating the asynchronous processing of a success report by the facility. Asynchronous processing of success reports preferably utilizes two threads, or units of execution. A main thread 1210 receives all error reports and success reports from error report generating programs, and itself processes received error reports. A success thread 1210 processes success reports transferred to the success thread 1220 by the main thread 1220, and is preferably spawned by the main thread 1210 during the initialization of the main thread. As discussed in greater detail below, the success thread 1220 preferably also ensures the persistently of the error state table. The main thread 1210 preferably transfers success reports to the success thread via a shared stack 1240. The shared stack is preferably manipulated using well-known push and pop operations, which are preferably protected by a single critical section synchronization mechanism to prevent more than one push or pop operation from being performed on the stack simultaneously. Access to the error state table 1250 is preferably also shared by the main thread 1210 and the success thread 1220, so that the main thread 1200 is able to set error states and success thread 1220 is able to clear error states. The error state table 1250 is preferably also protected by a synchronization mechanism, such as a lock, to prevent simultaneous updates to the error state table. Further, consolidated success reports, e.g., consolidated success report 1260, are preferably generated by the success thread 1220 and sent to the error presentation subsystem.

Inside main thread 1210, FIG. 12 shows the steps performed by the main thread 1210 relating to asynchronous success report processing. It should be appreciated that the main thread also performs other steps relating to other objectives, including error report processing, which are not shown in FIG. 12. The narrow arrows shown in the main thread 1210, as well as those shown in the success thread 1220, denote execution flow between steps. The wide arrows shown between component of the facility, on the other hand, denote data flow between those components. In step 1211, the main thread receives a success report as described above. In step 1212, the main thread pushes an entry 1241 representing the success report received in step 1211 onto the stack 1240. In order to represent the received success report, stack entry 1241 preferably contains representations of each of the fields contained by the received success report. Finally, in step 1213, the main thread notifies the success thread 1220 that it has pushed a success report onto the stack 1240 by signaling a synchronization mechanism monitored by the success thread called the success event. After signaling the success event in step 1213, the main thread 1210 continues executing, leaving the processing of the success report to the success thread 1220, and allowing the main thread to quickly return to the error report generating program so that the error report generating program can resume execution.

In step 1221, the success thread waits on the success event. That is, the success thread is suspended until the main thread signals the success event in step 1213, indicating that the main thread 1210 has pushed a success report entry 1241 onto the stack 1240. After the success event is signaled, the success thread continues at step 1222. In step 1222, the success thread pops the success report entry 1241 from the stack 1240, thereby receiving the fields contained in the success report generated by the error report generating program. In step 1223, the success thread processes the success report as discussed in conjunction with FIGS. 8, 9, and 10. Briefly, this involves clearing any error states corresponding to the success report by identifying and removing matching entries 1250 in the error state table 1250, then generating a consolidated success report 1260.

In step 1224, if the stack is now empty, the success thread continues at step 1221 to wait until the success event is again signaled, else the success thread continues at step 1222 to pop and process another success report. This permits the success thread to process any additional success reports that have been pushed onto the stack 1240 since the success event was signaled in step 1221.

Because the error state table is preferably stored in the memory 120 (FIG. 1B) whose contents are subject to occasional disruption by unforeseen events such as power failures, the facility preferably ensures that the contents of the error state table are maintained persistently. This involves periodically storing a copy of the current error state table in a more permanent medium, preferably on the storage device 131 (FIG. 1B). When the facility is restarted following an event disrupting the contents of the memory 120, the facility restores the error state table from the storage device 131, allowing the facility to resume with the error states that were set shortly before the disruption. The periodic storing step is preferably performed by success thread 1220 (FIG. 12), which, in addition to waiting on the success event to process a success report (FIG. 12, step 1221), also waits for an error state storage interval, such as five minutes, to store a copy of the current error state table on the storage device 131 (FIG. 1B). The facility may alternatively perform the periodic storing step in the main thread 1210, or may spawn an additional thread in which to perform the automatic storing step.

While this invention has been shown and described with reference to preferred embodiments, it will be understood by those skilled in the art that various changes or modifications in form and detail may be made without departing from the scope of the invention.

We claim:

1. A method in a computer system for consolidating related success reports, each corresponding to a particular error source and error type, the method comprising the computer-implemented steps of:

receiving a first success report specifying a selected error source and a selected error type;

in response to the step of receiving the first success report, generating consolidated success report specifying said selected error source and said selected error type;

after the step of receiving the first success report, receiving a second success report specifying said selected error source and said selected error type;

inhibiting the generation of a redundant consolidated success report specifying said selected error source and said selected error type in response to the step of receiving the second success report;

receiving an error report specifying said selected error source and said selected error type;

after the step of receiving the error report, receiving a third success report specifying said selected error source and said selected error type;

in response to the step of receiving the third success report, generating a consolidated success report specifying said selected error source and said selected error type;

after the step of receiving the third success report, receiving a fourth success report specifying said selected error source and said selected error type; and inhibiting the generation of a redundant consolidated success report specifying said selected error source and said selected error type in response to the step of receiving the fourth success report.

2. The method of claim 1 wherein the received error reports and success reports are received in response to attempting a failure-susceptible operation, further including the computer-implemented steps of:

when the operation is attempted, determining whether the operation succeeded or failed;

if it is determined in the determining step that the operation succeeded, issuing a success report; and if it is determined in the determining step that the operation failed, issuing a failure report.

3. The method of claim 2 wherein a plurality of different failure-susceptible operations are defined by a computer program, and wherein the determining step and both issuing steps are performed in response to an attempt to perform any of the plurality of operations, and wherein both the success report issued in the step of issuing the success report and the failure report issued in the step of issuing the failure report contains an identification of the operation attempted.

4. A method in a computer system for consolidating error and success reports generated by an error-reporting program, the method comprising the steps of:

receiving an error report specifying one of a plurality of error-prone operations;

in response to the step of receiving an error report, consolidating the received error report by:

determining whether a success report specifying the error-prone operation specified by the received error report has been received more recently than the last error report specifying the error-prone operation specified by the received error report, and generating a consolidated error report specifying the error-prone operation specified by the received error report only if a success report specifying the error-prone operation specified by the received error report has been received more recently than the last error report specifying the error-prone operation specified by the received error report;

receiving a success report specifying one of a plurality of error-prone operations; and in response to the step of receiving a success report, consolidating the received success report by:

determining whether an error report specifying the error-prone operation specified by the received success report has been received more recently than the last success report specifying the error-prone operation specified by the success error report, and generating a consolidated success report specifying the error-prone operation specified by the received success report only if an error report specifying the error-prone operation specified by the received success report has been received more recently than the last success report specifying the error-prone operation specified by the received success report.

5. A computer-readable medium whose contents cause a computer system to consolidate error and success messages generated by an error-reporting program by performing the steps of:

receiving an error report specifying one of a plurality of error-prone operations;

in response to the step of receiving an error report, generating a consolidated error report specifying the error-prone operation specified by the received error report only if the last error report specifying the error-prone operation specified by the received error report was received less recently than the last success report specifying the error-prone operation specified by the received error report;

receiving a success report specifying one of a plurality of error-prone operations; and in response to the step of receiving a success report, generating a consolidated success report specifying the error-prone operation specified by the received success report only if the last success report specifying the error-prone operation specified by the received success report was received less recently than the last error report specifying the error-prone operation specified by the received success report.

6. An apparatus for consolidating error reports generated by an error reporting program for an error-prone operation attempted by the error-reporting program using success reports also generated by the error-reporting program for the error-prone operation, comprising:

an error and success report receiver for receiving from the error-reporting program an error report when the error-reporting program unsuccessfully attempts the error-prone operation and for receiving from the error-reporting program a success report when the error-reporting program successfully attempts the error-prone operation; and a consolidated error report generator that generates a consolidated error report in response to receiving an error report in the error and success report receiver only in cases where each earlier-received error report, if any, was succeeded by a success report.

7. A method in a computer system for consolidating error reports generated by an error-reporting program, the method comprising the steps of:

determining that the error-reporting program has generated a selected error report specifying a selected one of a plurality of error-prone operations; and in response to the determining step, consolidating the selected error report by:

determining whether a success report specifying the selected error-prone operation has been generated by the error-reporting program more recently than the last error report was generated by the error-reporting program specifying the selected error-prone operation, and generating a consolidated error report specifying the selected error-prone operation only if a success report specifying the selected error-prone operation has been generated by the error-reporting program more recently than the last error report was generated by the error-reporting program specifying the selected error-prone operation.

8. The method of claim 7 wherein each success report specifying the selected error-prone operation is generated by the error-reporting program when the selected error-prone operation is successfully attempted by the error-reporting program.

9. The method of claim 7 wherein each error report specifying the selected error-prone operation is generated by the error-reporting program when the selected error-prone operation is unsuccessfully attempted by the error-reporting program.

10. A computer-readable medium whose contents cause a computer system to consolidate error messages generated by an error-reporting program by performing the steps of:

determining that the error-reporting program has generated a selected error report specifying a selected one of a plurality of error-prone operations; and in response to the determining step, consolidating the selected error report by, generating a consolidated error report specifying the selected error-prone operation only if a success report specifying the selected error-prone operation has been generated by the error-reporting program more recently than the last error report was generated by the error-reporting program specifying the selected error-prone operation.

11. A method in a computer system for consolidating success reports each indicating that an attempt to perform an error-prone operation has succeeded, the method comprising the steps of:

receiving a success report specifying a selected one of a plurality of error-prone operations; and in response to the step of receiving a success report:

determining whether the last success report specifying the error-prone operation specified by the received success report was received less recently than the last error report specifying the error-prone operation specified by the received success report, and generating a consolidated success report specifying the error-prone operation specified by the received success report only if the last success report specifying the error-prone operation specified by the received success report was received less recently than the last error report specifying the error-prone operation specified by the received success report.

12. The method of claim 54 wherein each success report specifying the selected error-prone operation is generated by the error-reporting program when the selected error-prone operation is successfully attempted by the error-reporting program.

13. The method of claim 54 wherein each error report specifying the selected error-prone operation is generated by the error-reporting program when the selected error-prone operation is unsuccessfully attempted by the error-reporting program.

14. A computer-readable medium whose contents cause a computer system to consolidate success messages each indicating that an attempt to perform an error-prone operation has succeeded by performing the steps of:

receiving a success report specifying one of a plurality of error-prone operations; and in response to the step of receiving a success report:

determining whether the last success report specifying the error-prone operation specified by the received success report was received less recently than the last error report specifying the error-prone operation specified by the received success report, and generating a consolidated success report specifying the error-prone operation specified by the received success report only if the last success report specifying the error-prone operation specified by the received success report was received less recently than the last error report specifying the error-prone operation specified by the received success report.

15. A method in a computer system for consolidating reports each indicating a result of an attempt to perform an error-prone operation by a selected program, the result indicating whether the error-prone operation succeeded or failed, the method comprising:

receiving a result report specifying the result of an attempt to perform a selected one of a plurality of error-prone operations by the selected program; and in response to the step of receiving the result report, generating a consolidated result report specifying the error-prone operation specified by the received result report only if the last result report specifying the same error-prone operation specified by the received result report specified a result that is different from the result specified in the last result report.

16. The method of claim 15 wherein the received result report is a success report indicating that the error-prone operation succeeded, and the last result report is an error report indicating that the error-prone operation failed.

17. The method of claim 15 wherein the received result report is an error report indicating that the error-prone operation failed, and wherein the last result report is a success report indicating that the error-prone operation succeeded.

18. A computer memory containing an error state data structure for consolidating error and success messages each corresponding to one of a plurality of error-prone operations, the error state data structure comprising a plurality of entries each identifying a different error-prone operation and indicating whether an error message or a success message corresponding to the error-prone operation has been received more recently, such that the error state data structure may be used when an error message corresponding to an error-prone operation is received to forward the error message only if the error state data structure indicates that a success report corresponding to the error-prone operation was received more recently than an error report corresponding to the error-prone operation, and such that the error state data structure may be used when an success message corresponding to an error-prone operation is received to forward the success message only if the error state data structure indicates that an error report corresponding to the error-prone operation was received more recently than a success report corresponding to the error-prone operation.

* * * * *